United States Patent
Odenmo

[11] Patent Number: 6,033,639
[45] Date of Patent: Mar. 7, 2000

[54] METHOD FOR CLEANING PROCESS GASES

[75] Inventor: Peter Odenmo, Växjö, Sweden

[73] Assignee: ABB Fläkt AB, Stockholm, Sweden

[21] Appl. No.: 09/077,821

[22] PCT Filed: Nov. 29, 1996

[86] PCT No.: PCT/SE96/01569

§ 371 Date: Jun. 4, 1998

§ 102(e) Date: Jun. 4, 1998

[87] PCT Pub. No.: WO97/22403

PCT Pub. Date: Jun. 26, 1997

[30] Foreign Application Priority Data

Dec. 15, 1995 [SE] Sweden .................................. 9504509

[51] Int. Cl.⁷ .................................................. B01D 53/34
[52] U.S. Cl. ................ 423/210; 423/240 R; 423/240 S; 423/243.08; 423/244.07; 423/215.5; 423/DIG. 18
[58] Field of Search ......................... 423/DIG. 18, 240 S, 423/240 R, 245.1, 244.07, 243.08, 210, 215.5

[56] References Cited

U.S. PATENT DOCUMENTS

| | | | |
|---|---|---|---|
| 4,208,381 | 6/1980 | Isahaya et al. | 423/210 |
| 4,208,383 | 6/1980 | Kisters et al. | 423/215.5 |
| 4,229,411 | 10/1980 | Kisters et al. | 422/62 |
| 5,084,256 | 1/1992 | McElroy et al. | 423/244 |

FOREIGN PATENT DOCUMENTS

| | | |
|---|---|---|
| 0596229 A1 | 5/1994 | European Pat. Off. . |
| 0646404 A1 | 4/1995 | European Pat. Off. . |
| 3234796 C2 | 11/1986 | Germany . |
| 50-150675 | 12/1975 | Japan ................................ 423/244.07 |
| 61-138518 | 6/1986 | Japan ................................ 423/240 S |
| 5-154337 | 6/1993 | Japan ................................ 423/244.07 |
| WO 88/06484 | 9/1988 | WIPO ................................ 423/244.07 |

*Primary Examiner*—Steven P. Griffin
*Assistant Examiner*—Timothy C Vanoy
*Attorney, Agent, or Firm*—Burns, Doane, Swecker & Mathis, L.L.P.

[57] ABSTRACT

A method for cleaning process gases is provided, in which a sorbent is supplied to the process gases for reaction with gaseous pollutants that are present therein, thereby forming particulate reaction products which are separated in a subsequent particulate separator, and in which the moisture content and temperature of the cleaned process gases are measured to determine the relative humidity of the process gases and the concentration of at least one of the gaseous pollutants in the cleaned process gases is measured, wherein the relative humidity of the process gases is increased from a substantially constant basic level (BL) to an increased level (IL) and the amount of sorbent supplied to the process gases is increased when the concentration of at least one gaseous pollutant in the cleaned process gases exceeds an upper limit value (UL), and wherein the relative humidity is decreased back to said basic level, after a period of time and/or when the concentration of at least one gaseous pollutant in the cleaned process gases is below a lower limit value (LL).

12 Claims, 3 Drawing Sheets ize: 6,033,639

METHOD FOR CLEANING PROCESS GASES

This application is a national stage filing under 35 U.S.C. § 371 of PCT/SE96/01569, filed Nov. 29, 1996.

FIELD OF THE INVENTION

The present invention relates to a method for cleaning process gases, such as flue gases formed during combustion in a boiler, especially during combustion of waste, in which method a sorbent, such as an absorbent and/or an adsorbent, is supplied to the process gases for reaction with gaseous pollutants that are present therein, such as acidifying components and/or heavy metals and/or organic compounds, whereby particulate pollutants are formed, which are separated in a subsequent dust separator.

BACKGROUND OF THE INVENTION

For sorption of gaseous pollutants, two different methods are usually applied, the so-called dry method and the so-called wet-dry method.

As a rule, the dry method is applied in the combustion of waste and is distinguished in that a sorbent in the form of a dry, finely divided powder is supplied to the flue gases in a contact reactor. The sorbent can be, for instance, an absorbent, such as lime, which thus absorbs the acidifying components that are present in the flue gases, whereby particulate pollutants are formed, which together with the remaining so-called residual products are separated in a subsequent dust separator, such as a bag filter. To obtain an operating temperature that is suitable for the absorption, the flue gases are usually cooled by injection of water which is evaporated therein in a cooling tower arranged before the contact reactor. The wet-dry method is usually applied in the combustion of waste or coal and is distinguished in that a sorbent solution or sorbent suspension is injected into the flue gases in a contact reactor. Also in this case, the separation of the particulate pollutants formed takes place in e.g. a bag filter. An operating temperature that is suitable for the sorption is obtained by the water in the solution or suspension being evaporated in the flue gases. Both methods result in a completely dry residual product.

It is known that the sorption capacity and, thus, the degree of separation depends to a great extent on the temperature and moisture content at which the sorption takes place. The ratio of the temperature of the flue gases to the moisture content thereof can be expressed in their relative humidity or so-called condition.

It may be mentioned that relative humidity is, by definition, the ratio of the current partial pressure of the water vapour to the corresponding saturation pressure at the same temperature. The moisture content of the flue gases derives on the one hand from the inlet moisture content after combustion and, on the other hand, from the amount of water supplied for cooling the flue gases. With an increased moisture content, the sorption capacity increases, i.e. the tendency of the sorbent to react with the gaseous pollutants of the flue gases, which, for a satisfactory sorbent utilisation, makes it necessary to decrease the temperature as much as possible. There is, however, an upper limit for the moisture content in respect of the separated residual products. At too high a moisture content, the residual products will be moist and, thus, sticky, which results in clogging of the filter bags of the bag filter. The residual products will also be practically impossible to handle. The hygroscopic calcium chloride formed by the reaction between lime as absorbent and the hydrogen chloride of the flue gases is very important to the moisture content of the separated residual products. On the other hand, too low a moisture content reduces the sorption capacity, which makes the sorbent consumption increase for a given degree of separation. Thus, it is difficult to control the condition of the flue gases to a level which is optimum for the process concerned.

The temperature and moisture content of the flue gases as well as the amount of acidifying components often fluctuate widely, among other things owing to great variations in the composition of the fuel that is being burnt, especially in the combustion of waste. These fluctuations may also be very rapid and thus result in emission peaks, i.e. temporarily high outlet contents of the gaseous pollutants of the flue gases. The controlling of the condition of the flue gases to a level that is optimum for the process concerned thus is rendered still more difficult.

According to conventional technique in, for instance, the dry method, the temperature in the dust separator is set at a constant level by the required amount of water being controlled and injected into the flue gases, the temperature of the flue gases being continuously measured, preferably directly after the cooling tower. Since the moisture content of the flue gases fluctuates as described above, the condition thereof cannot be controlled by this technique. To avoid the sticky residual products, the average value of the moisture content must therefore be selected by a great margin in relation to the defined saturation curve of the calcium chloride when lime is used as absorbent, which thus implies that a relatively high constant temperature must be selected. Consequently, this results in a lower degree of separation and/or a higher consumption of sorbent. The lime is injected into the flue gases as usual in a contact reactor arranged between the cooling tower and the dust separator. The amount of lime is supplied with respect to the content of acidifying components. Since a control of the emission of acidifying components is only connected to the supply of lime and not integrated with the control of the water supply or the cleansing, it is thus not possible to achieve optimum conditions for the separating of acidifying components. Owing to inertia in the control system and the lime in itself, this has a slow response in respect of the absorption of acidifying components, especially in case of emission peaks. It thus takes a relatively long time before a sufficient amount of lime has been supplied to the flue gases to overcome the content of acidifying components, which increases in case of an emission peak. That stated above will appear from the curves A, B and C0 in FIG. 1, the sum of the times t1 and t2 being the total response time of the lime.

It is thus also difficult to satisfy the greater and greater requirements that are placed on emission guarantees with permissible maximum average values over short times, such as the new EU requirements which are connected to 24-hour and 30-minute average values. The 24-hour average values for hydrogen chloride and sulphur dioxide according to these new rules will be, for instance, 10 and 50 mg/Nm$^3$, respectively, and the corresponding 30-minute average values will be 60 and 200 mg/Nm$^3$, respectively. It is also difficult to comply with customers' requirements, which do not allow emission to exceed a given maximum momentaneous limit value.

EP 596 229 discloses a method concerning the dry and the wet-dry method for cleaning flue gases formed in the combustion of waste. Here, use is made of a calcium-containing absorbent for separating the acidifying components of the flue gases. To achieve a favourable condition and at the same time prevent the separated residual products from being overmoistened owing to hygroscopic calcium chloride, the inlet temperature and moisture content of the flue gases to the contact reactor as well as inlet gas flow are measured. A quantity of water that is necessary for this purpose can be determined in consideration of the corresponding measured values of the outlet temperature and the possible moisture content of the flue gases leaving the contact reactor. The quantity of water is controlled in this manner and injected into the flue gases for cooling to a predetermined operating temperature and moisture content, i.e. condition, which thus lies at a predetermined constant basic level relative to the saturation curve defined for the calcium chloride. As a result, the problem with the forming of overmoistened, sticky residual products is in fact eliminated. However, the relatively great distance between the above-mentioned constant level and the saturation curve of the calcium chloride does not result in an optimum absorption capacity, which leads to a lower degree of separation and, consequently, a higher consumption of absorbent in order not to exceed the set limit values of the emission, especially when the emission temporarily has high contents of acidifying components. The control system for the condition of the flue gases will also be relatively complicated and expensive to accomplish since it requires extensive measuring equipment for measuring the above-mentioned parameters. Besides, the consumption of absorbent will be higher since the monitoring of the emission and the controlling of the cleansing are not integrated with this control system. A higher consumption of absorbent implies an increased amount of unused absorbent in the residual products, which results in increased costs for the provision of absorbent as well as the deposition of these residual products.

OBJECT AND SUMMARY OF THE INVENTION

The object of the present invention thus is to provide, in view of that stated above, such a method for cleaning process gases, such as flue gases, preferably by means of a rapid, simple and inexpensive control system, that the set limit values for the emission of the gaseous pollutants of the process gases are not exceeded, especially when there are high contents of these pollutants, and to ensure the handling of the residual products while the consumption of sorbent for separating said pollutants is kept at a minimum.

This object is achieved by a method, which is of the type mentioned by way of introduction, the moisture content and temperature of the process gases being measured, and which according to the present invention is characterised in that the content of at least one of the gaseous pollutants in the process gases is measured. The relative humidity of the process gases, which is determined on the basis of said moisture content and temperature, is increased from a substantially constant basic level to an increased level, said increase being initiated by said content exceeding an upper limit value. The amount of sorbent supplied to the process gases is increased. The relative humidity is decreased after a limited first period, and/or this decrease is initiated by said content being below a lower limit value, thereby restoring the relative humidity to said basic level.

The basic level of the relative humidity is preferably in the range of about 2–40%. The basic level is determined, based on experience of each individual process, by the parameters affecting the relative humidity, such as temperature, moisture content, handling of residual products, corrosion, and is the optimum condition that can be allowed for continuous operation of the process concerned, without any problems with the above-mentioned residual products. In, for instance, the combustion of waste according to the dry method, the relative humidity can be in the range of about 4–6%, corresponding to a temperature range of about 110–150° C., whereas the relative humidity in, for instance, the combustion of coal can be in the range of about 30–40%, corresponding to a temperature range of about 60–80° C.

The relative humidity is increased by the above-mentioned increase which preferably is in the range of about 0–50%, and is then decreased during said first period which preferably is in the range of 0–6 h, especially about 1–20 min. The increase of the relative humidity and said first period are determined on the basis of each individual process. It should be noted that the increase and also the decrease of the relative humidity takes place very rapidly, preferably during a period in the order of about 20–40 s.

The relative humidity is preferably increased before increasing the supply of sorbent, the sorbent being present in the form of a dry powder, but can advantageously also be wholly or partly increased by an increased supply of a sorbent solution or sorbent suspension. The increased amount of added sorbent, sorbent solution or sorbent suspension, which according to the invention is integrated with the controlling of the relative humidity, is determined on the basis of each individual process in respect of the content of gaseous pollutants of the process gases.

Preferably, the inlet and/or outlet content of gaseous pollutant(s) is measured, such as hydrogen chloride and/or sulphur dioxide and/or mercury. By inlet content is meant the raw gas content, while by outlet content is meant the content of gaseous pollutant in the cleaned process gases which are emitted into the atmosphere.

The absorbent preferably consists of lime, such as limestone, burnt lime or calcium hydroxide, of sodium bicarbonate or of sodium carbonate, and the adsorbent preferably consists of carbon, such as activated carbon or coke.

The relative humidity is preferably increased by supplying a fluid, especially water, which is evaporated in the process gases, and/or by decreasing the temperature preferably by means of an energy recovery step, especially a heat exchanger, such as an economiser connected to the boiler.

The cleansing of the dust separator can be carried out after a limited second period after the last cleansing operation, which preferably is in the range of about 0–24 h, and is preferably carried out when the relative humidity is kept on said basic level or below said basic level, the relative humidity being decreased so as to be increased again to said basic level after the cleansing operation. The amount of sorbent supplied to the process gases is preferably increased when the relative humidity is below said basic level in order to compensate for the non-optimum condition of the process gases. By being, during cleansing, on or below said basic level as stated above, the handling of the residual products is ensured.

According to the present invention, a very favourable condition of the process gases is quickly attained owing to the rapid increase of the relative humidity. This means a very rapid response in respect of the reaction between the sorbent present in the process and the gaseous pollutants until the increased amount of supplied sorbent gives an effect. It has been found that the response time in respect of the sorption for the relative humidity is very much shorter than the corresponding response time for the sorbent. Since the relative humidity of the process gases is above the basic level which is already optimal for the continuous operation of the process involved, the sorbent gets a very good sorption capacity owing to the very favourable condition.

This rapid increase of the relative humidity in combination with the slower supply of sorbent results in an increased degree of separation and, thus, a lower level of emission while a minimum consumption of sorbent for separating the gaseous pollutants present in the process gases is achieved. The greater and greater requirements that are placed on emission guarantees with permissible maximum average values ever very short times and also momentaneous limit values can thus be complied with. The increase of the relative humidity in fact results in an undesired increased moisture of the separated residual products. Since said increase takes place for a short time only, the resulting moist residual products, however, cause no problem, but they are diluted in the considerably greater amount of dry residual products.

DESCRIPTION OF THE PREFERRED EMBODIMENTS

Figure 1:
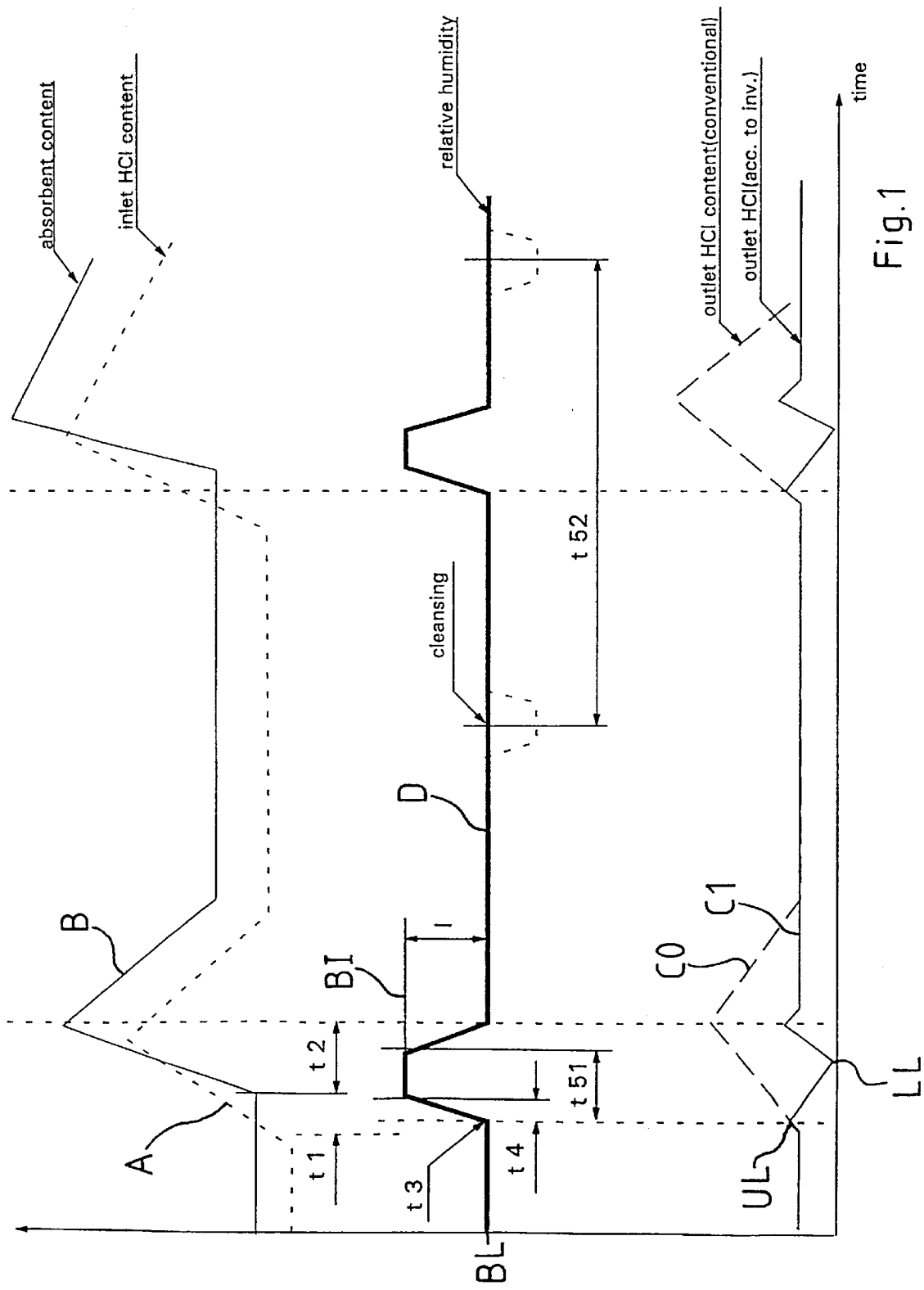
FIG. 1 illustrates schematically an example of the dynamics of the control system according to the invention.
Figure 3:
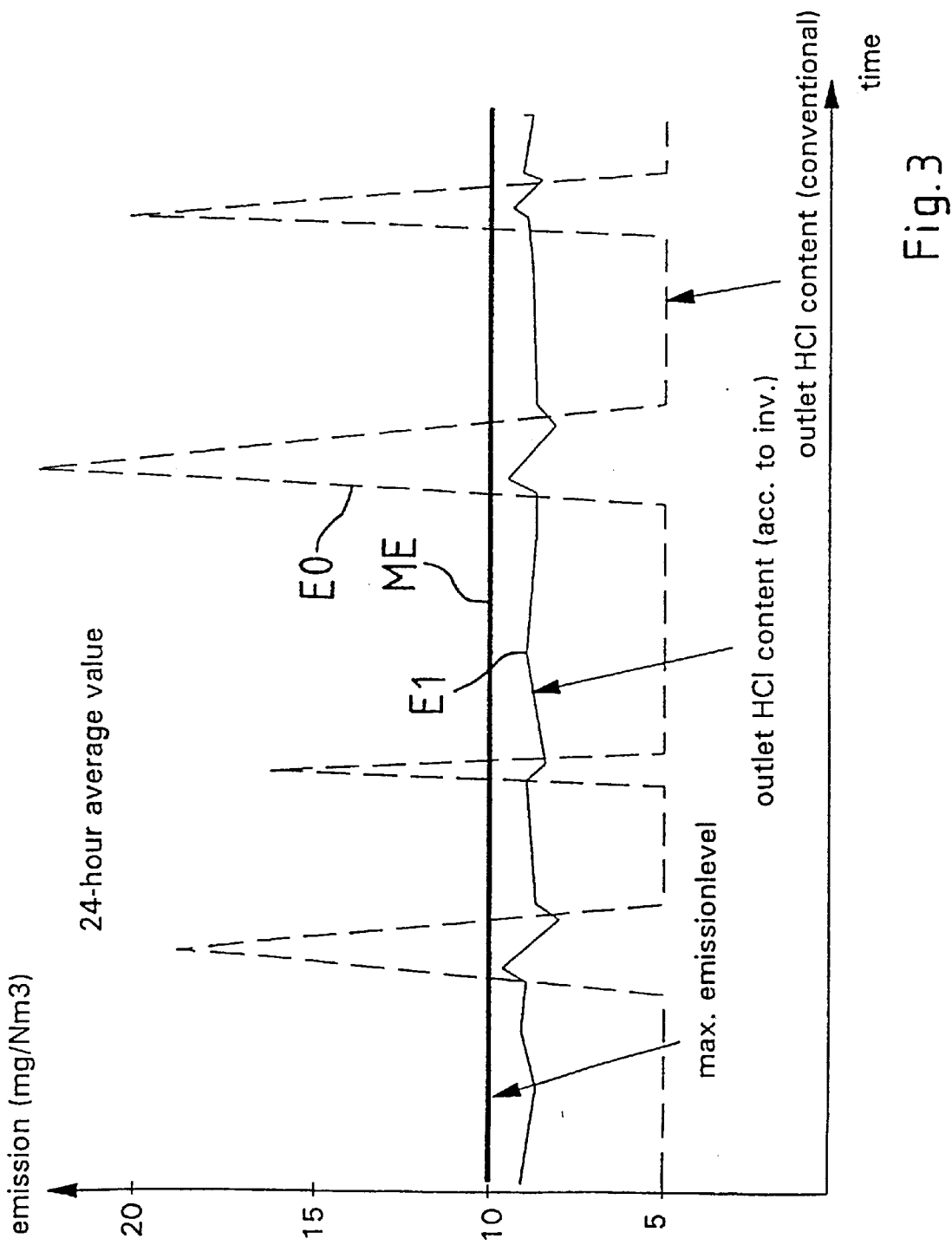
FIG. 3 illustrates an example of the outlet content of hydrogen chloride according to the present invention and the conventional technique, in which the 24-hour average value in both cases does not exceed a given maximum level of emission.

FIG. 1 thus schematically illustrates an example of the dynamics of the control system for the relative humidity in respect of the content of an acidifying component, which here consists of hydrogen chloride, in flue gases which are formed in the combustion of waste, as well as the effect of the invention in relation to the conventional technique (see also FIG. 3).

Curve A in FIG. 1 represents the fluctuation of the inlet content, i.e. the raw gas content, of the hydrogen chloride of the flue gases, and curve B represents the change, corresponding to the fluctuation of the inlet hydrogen chloride content, of the sorbent supplied to the flue gases for reaction with the acidifying components thereof, such as hydrogen chloride and sulphur dioxide, and the formation of particulate, separable pollutants. The sorbent consists of an absorbent in the form of finely divided lime powder. The content of inlet hydrogen chloride varies according to curve A typically in the range of 200–1000 mg/Nm$^3$, and the content of added lime varies according to curve B typically in the range of 200–3000 mg/Nm$^3$.

The fluctuation of the inlet content of hydrogen chloride according to curve A results. according to conventional technique, in undesired peaks of emission, i.e. a temporarily high content of outlet hydrogen chloride, which is represented by curve C0. The content of outlet hydrogen chloride varies typically in the range of 5–30 mg/Nm$^3$. These emission peaks depend on the fact that the lime supply which is increased according to curve B is not sufficiently rapid. On the one hand, the actual inertia in the control system causes a time delay t1 from the giving of the control signal for an increased supply of lime until the amount of lime supplied to the flue gases begins to increase and, on the other hand, it takes a time t2 before a sufficiently increased amount of lime has been supplied to overcome the increased content of hydrogen chloride. The times t1 and t2, respectively, are in the order of 1–5 min and are evident from FIG. 1. The sum of the times t1 and t2 constitutes the total response time of the lime, whereupon the lime gives full effect.

Merely an increased supply of lime thus is not sufficiently rapid to manage these high emission peaks, and therefore the relative humidity of the flue gases is increased for a short time according to the present invention, which appears from curve D, representing the control of the relative humidity. This takes place based on an optimum, constant basic level BL of the relative humidity when the measured content of outlet hydrogen chloride exceeds a predetermined upper limit value UL. The basic level BL of the relative humidity is accomplished by controlling the operating temperature in respect of the outlet moisture content of the flue gases according to the process concerned. The relative humidity of the flue gases is increased by increasing the amount of supplied water. The supply of water takes place practically immediately without any considerable time delay, which is indicated by the very short period t3 which thus constitutes the total response time of the relative humidity. This means that the flue gases quickly get a very favourable condition for the reaction of their acidifying components and the lime present in the process, the outlet content of hydrogen chloride rapidly decreasing, which appears from curve C1 representing the outlet content of hydrogen chloride in the method according to the invention. The increase I of the relative humidity to the increased level BI takes the time t4, whereupon the relative humidity gives full effect. After the time delay t1, the amount of lime supplied to the flue gases begins to increase, the relative humidity being decreased after a period t51 limited according to the process involved when a sufficient amount of lime has been added, so as to return to the optimum constant basic level BL of the relative humidity. The above-described method according to the invention is repeated once more when the content of hydrogen chloride again exceeds the upper limit value UL.

Although the outlet content of hydrogen chloride, thanks to the increase I of the relative humidity, rapidly decreases, the supply of lime is increased, as stated above. The supplied amount of lime thus reacts with the acidifying components of the flue gases partly during and essentially after the above-mentioned increased level BI. Since the increase I of the relative humidity has a much quicker response to the separation of acidifying components compared with an increase of the supply of lime only, emission peaks can in this manner be kept down on a level according to set limit values until the lime itself again takes over the emission control. This is apparent from the content of outlet hydrogen chloride according to curve C1.

The increase I of the relative humidity creates a very favourable condition of the flue gases, which results in a high utilisation of the lime and, thus, a low consumption of sorbent. As the increased level BI of the relative humidity is of short duration only, this condition can be permitted, which is above the optimum level, possible for continuous operation, i.e. the basic level BL. The moist calcium chloride formed, which results in the separated residual products becoming sticky, thus constitutes no problem thanks to the short duration of the increased level BI of the relative humidity since the separated moist amount of residual products is diluted in a considerably greater separated dry amount of residual products, which thus serves as a buffer. The period t52, which appears from curve D, between two successive cleansing operations is determined according to the process involved, the relative humidity being temporarily decreased below the basic level BL so as to be increased again to the basic level BL after cleansing. In the cleansing operation, the amount of lime is increased to compensate for the non-optimum condition (not shown). Alternatively, the cleansing operation can be carried out on the basic level BL. As a result, the handling of the residual products is ensured. It should be noted that the curves according to FIG. 1 are not to scale, but only serve to illustrate the principle according to the present invention.

Figure 2:
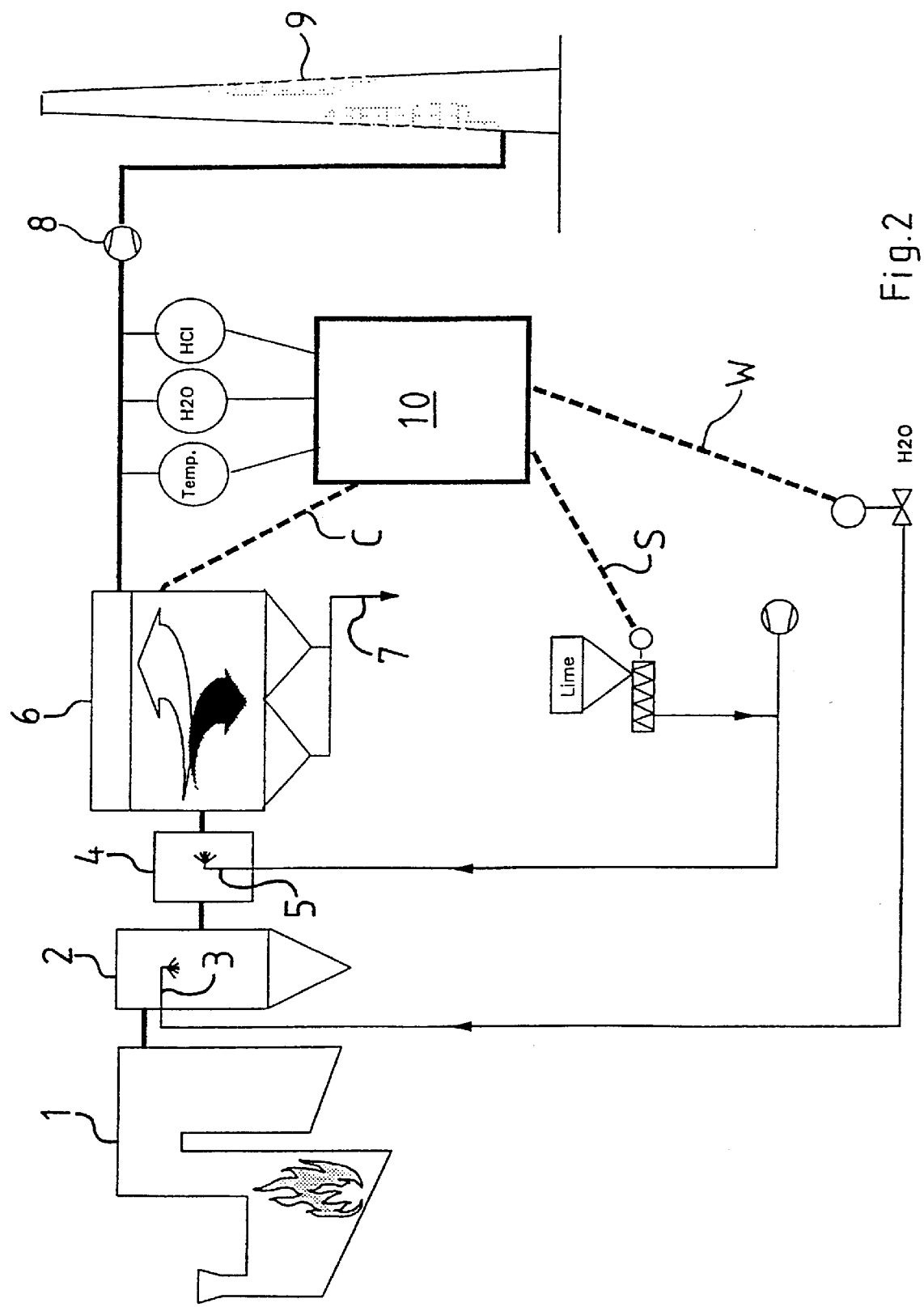
FIG. 2 illustrates schematically an example of an installation, in which the inventive method can be utilised.

FIG. 2 is a schematic view of an installation regarding the dry method for flue gas cleaning, in which the method according to the present invention can be used to control in an optimum fashion the emission of gaseous pollutants by means of a control system, especially in the case of emission peaks, and to ensure the handling of the residual products. The installation comprises a cooling tower 2, a contact reactor 4 and a fabric filter in the form of a bag filter 6 for separating residual products from flue gases formed in the combustion of waste.

Fuel consisting of waste, such as household waste and industrial waste, is supplied to a boiler 1. The flue gases formed during combustion in the boiler 1 contain substantially dust and acidifying components, such as sulphur dioxide and hydrogen chloride, and have an outlet temperature from the boiler 1 in the range of about 200–300° C. The temperature and moisture content of the flue gases formed vary rapidly and strongly above all owing to the inhomogeneous composition of the waste that is being burnt. The flue gases first pass through a cooling tower 2, in which they are cooled by injection of an amount of water which is controlled with regard to the outlet temperature and moisture content of the flue gases leaving the bag filter, such that an optimum, constant basic level BL of the relative humidity is obtained. Water is injected in conventional manner with the aid of a nozzle assembly 3. The cooled flue gases are now passed into the contact reactor 4 and are supplied with lime in the form of finely divided calcium hydroxide. Also the calcium hydroxide is injected in conventional manner with the aid of a nozzle assembly 5. After cooling in the cooling tower 2, the flue gases thus have a condition which is very favourable for the reaction between the acidifying components thereof and the calcium hydroxide. Subsequently, the flue gases are passed into a bag filter 6, in which the formed residual products consisting of dust, reaction products and unutilised calcium hydroxide are separated. The cleansing of the filter bags of the bag filter 6 can take place at predetermined regular intervals, the residual products being removed, as indicated by arrow 7, through a conduit for further handling and deposition. The outlet content of hydrogen chloride in the cleaned flue gases leaving the bag filter 6, as well as the outlet temperature and moisture content of the flue gases are measured continuously, and these parameters are indicated in FIG. 2 by HCl, Temp and $H_2O$, respectively. The cleaned flue gases are finally conducted via a fan 8 to a chimney 9 for emission into the atmosphere.

When the outlet content of hydrogen chloride now exceeds the predetermined maximum 24-hour average value UL of e.g. 10 mg $HCl/Nm^3$, the relative humidity is briefly increased by an increased injection of water into the flue gases in the cooling tower 2 from the optimum, constant basic level BL, which is established by experience of the process involved and amounts to e.g. 5.6% RH, to the increased level BI of e.g. 7.3% RH, i.e. an increase I of about 30%. The supply of calcium hydroxide is increased in parallel to meet the increased content of hydrogen chloride in the flue gases by an amount of e.g. 1000 $mg/Nm^3$. The control signals of the above-mentioned parameters as measured are processed in a control unit 10 consisting of a control system. As a result, the amount of water and calcium hydroxide supplied to the flue gases is controlled, which is indicated by the dashed lines W and S, respectively. The relative humidity is once more decreased from the increased level BI after the period t51, which is predetermined according to the process concerned and amounts to e.g. 5 min, to the above-mentioned basic level BL when a sufficient amount of lime has managed to be supplied to the process. Moreover, two successive cleansing operations of the filter bags of the bag filter 6 will be carried out after the period t52 of, for instance, 1 h when the relative humidity is kept on the above-mentioned basic level BL, i.e. when temporarily high contents of acidifying components are not present. Alternatively, the relative humidity is temporarily decreased to a predetermined level below the basic level BL, the amount of calcium hydroxide being increased to compensate for the non-optimum condition. The controlling of the relative humidity, carried out by the control unit 10, in respect of the cleansing of the bag filter 6 is indicated by the dashed line C. In this manner, the control system performs a complete control of the emission with a very low consumption of calcium hydroxide, while ensuring the handling of the residual products. Since only temperature, moisture content and content of hydrogen chloride need to be measured, the quick control system will be simple and inexpensive.

FIG. 3 shows in a very simple manner an example of the outlet content of hydrogen chloride according to the invention, curve E1, and according to conventional technique, curve E0, whose average values both comply with the permissible maximum emission level ME, which is set at 10 mg $HCl/Nm^3$ and indicates the 24-hour average value. To ensure according to conventional technique that this average value of the emission of the outlet content of hydrogen chloride is not exceeded, an amount of calcium hydroxide is supplied continuously, corresponding to an emission level of 5 mg $HCl/Nm^3$ owing to the emission peaks. During the periods between these emission peaks, there is supplied and, consequently, consumed more calcium hydroxide than is required so as not to exceed the above-mentioned 24-hour average value. The amount of calcium hydroxide which, however, needs to be supplied according to the invention corresponds to an emission level according to curve E1, which is about 9 mg $HCl/Nm^3$, i.e. immediately below the emission level ME. Considerably smaller margins can thus be permitted, which results in a considerably lower consumption of calcium hydroxide. In tests using calcium hydroxide as absorbent having the above-mentioned permissible maximum emission level ME, it has been found that a very high degree of utilisation of the absorbent is achieved. By analysing the unutilised amount of calcium hydroxide in the residual products separated from the bag filter 6, the following results were obtained. The unutilised amount of calcium hydroxide according to the invention was found to be about 5% by weight of the total amount of residual products. This result should be compared with the corresponding unutilised amount of calcium hydroxide of about 20% by weight of the residual products according to conventional technique. In these tests, a fourfold saving of the consumption of calcium hydroxide could thus be established.

Of course, the invention is not restricted to the above-described method or application and can be modified in various ways within the scope of the appended claims.

For instance, the sorbent may consist of an adsorbent, such as activated carbon, or a combination of an absorbent and an adsorbent instead of an absorbent only, such as lime.

For example, the relative humidity can be controlled in respect of the outlet content of sulphur dioxide, mercury or dioxins, instead of the outlet content of hydrogen chloride.

For instance, the relative humidity can be controlled in respect of the inlet content of hydrogen chloride, sulphur dioxide, mercury or dioxins, instead of the outlet content of hydrogen chloride.

For instance, the relative humidity can be controlled by controlling the temperature of the flue gases discharged from the boiler 1 by means of a heat exchanger or an economiser connected to the boiler 1, instead of by supplying water to the flue gases in the cooling tower 3.

For instance, the method according to the invention can be applied to the cleaning of gaseous pollutants that are present in the flue gases and formed in the combustion of coal, instead of in the combustion of waste.

For instance, the method according to the invention can be applied to the wet-dry method, a solution or a suspension of the sorbent being supplied to the flue gases, after optional cooling thereof, in the contact reactor 4, instead of to the dry method, the sorbent being supplied to the flue gases in the form of finely divided dry powder. In the wet-dry method the relative humidity is wholly or partly controlled by the supply of the solution or suspension.

We claim:

1. A method for cleaning process gases, in which a sorbent is supplied to the process gases for reaction with gaseous pollutants that are present therein, thereby forming particulate reaction products which are separated in a subsequent particulate separator, and in which the moisture content and temperature of the cleaned process gases are measured to determine the relative humidity of the process gases and the concentration of at least one of the gaseous pollutants in the cleaned process gases is measured, wherein the relative humidity of the process gases is increased from a substantially constant basic level (BL) to an increased level (EL) and the amount of sorbent supplied to the process gases is increased when the concentration of at least one gaseous pollutant in the cleaned process gases exceeds an upper limit value (UL), and wherein the relative humidity is decreased back to said basic level, after a period of time and/or when the concentration of at least one gaseous pollutant in the cleaned process gases is below a lower limit value (LL).

2. The method as claimed in claim 1, wherein said process gases are flue gases from a combustion boiler.

3. The method as claimed in claim 2, wherein said combustion boiler combusts waste.

4. The method as claimed in claim 1, wherein said sorbent comprises an absorbent and/or an adsorbent.

5. The method as claimed in claim 1, wherein said gaseous pollutants comprise hydrogen chloride and/or sulfur dioxide.

6. The method as claimed in claim 1, wherein said particulate separator is a bag filter.

7. The method as claimed in claim 1, wherein the basic level (BL) of the relative humidity is in the range of about 2 to 40 percent.

8. The method as claimed in claim 1, wherein the relative humidity is increased by 50 percent of less.

9. The method as claimed in claim 1, wherein the relative humidity is increased and then decreased during a period of time which is 6 hours or less.

10. The method as claimed in claim 9, wherein the relative humidity in increased and then decreased during a period of time which is about 1 to 20 minutes.

11. The method as claimed in claim 1, wherein the relative humidity is increased before increasing the supply of sorbent.

12. The method of claim 1, wherein said sorbent is selected from the group consisting of burnt lime, limestone, calcium hydroxide, sodium bicarbonate and sodium carbonate.

* * * * *